(12) United States Patent
Ventz et al.

(10) Patent No.: US 10,941,006 B2
(45) Date of Patent: Mar. 9, 2021

(54) VERTICAL DIVERTER FOR A CONVEYOR SYSTEM

(71) Applicant: TRANSNORM SYSTEM GmbH, Harsum (DE)

(72) Inventors: Kai-Ulrich Ventz, Hildesheim (DE); Rene Schaellig, Hildesheim (DE)

(73) Assignee: TRANSNORM SYSTEM GMBH, Harsum (DE)

( * ) Notice: Subject to any disclaimer, the term of this patent is extended or adjusted under 35 U.S.C. 154(b) by 0 days.

(21) Appl. No.: 16/705,325

(22) Filed: Dec. 6, 2019

(65) Prior Publication Data
US 2020/0180873 A1 Jun. 11, 2020

(30) Foreign Application Priority Data
Dec. 7, 2018 (DE) .................. 10 2018 131 398

(51) Int. Cl.
*B65G 47/64* (2006.01)
*B65G 15/12* (2006.01)
*B65G 21/12* (2006.01)

(52) U.S. Cl.
CPC ........... *B65G 47/647* (2013.01); *B65G 15/12* (2013.01); *B65G 21/12* (2013.01); *B65G 2201/0264* (2013.01)

(58) Field of Classification Search
CPC ...... B65G 47/647; B65G 21/12; B65G 15/12; B65G 2201/0264; B65G 47/645
(Continued)

(56) References Cited

U.S. PATENT DOCUMENTS 5,421,446 A * 6/1995 Koch .................... B65G 47/647
198/369.7
5,810,149 A * 9/1998 Sandberg ............... B65G 47/52
198/369.2
(Continued)

FOREIGN PATENT DOCUMENTS

AT           509425 A1    8/2011
DE     102014117392 A1    6/2016
(Continued)

OTHER PUBLICATIONS

European search opinion issued in European Application No. 19214305. 5, dated May 6, 2020, 5 pages.
(Continued)

*Primary Examiner* — Mark A Deuble
(74) *Attorney, Agent, or Firm* — Alston & Bird LLP

(57) ABSTRACT

The invention relates to a vertical diverter for a conveyor system having a lower conveyor track and an upper conveyor track, wherein the vertical diverter is provided and designed for vertically connecting the two conveyor tracks, and the vertical diverter has a lower diverter track and an upper diverter track. The vertical diverter is characterized in that the lower diverter track is shorter than the upper diverter track, that the lower diverter track is provided and designed to be lowered at least at one end in order to make room for the connection of the end of the upper diverter track to be lowered, and that the upper diverter track is provided and designed to be lowered at least at one end, and that the lowered end of the upper diverter track rests where the unlowered end of the lower diverter track previously rested.

11 Claims, 5 Drawing Sheets

(58) Field of Classification Search
USPC .................................................. 198/369.2
See application file for complete search history.

(56) References Cited

U.S. PATENT DOCUMENTS

| | | | | |
|---|---|---|---|---|
| 6,557,724 | B1 * | 5/2003 | Lecroy .................. | B65G 47/52 |
| | | | | 198/435 |
| 6,851,919 | B2 * | 2/2005 | Cinotti ................... | B65B 35/44 |
| | | | | 198/369.2 |
| 2002/0104736 | A1 * | 8/2002 | Peppel ................ | B65G 47/647 |
| | | | | 198/369.2 |
| 2018/0305137 | A1 * | 10/2018 | Philipp ............... | B65G 47/647 |

FOREIGN PATENT DOCUMENTS

| | | | | |
|---|---|---|---|---|
| EP | 1475324 B1 | 6/2006 | | |
| JP | 49-106070 U | 9/1974 | | |
| JP | S49016070 U * | 9/1974 | ............. | B65G 47/64 |
| WO | 97/33820 A1 | 9/1997 | | |
| WO | 2005/021410 A1 | 3/2005 | | |

OTHER PUBLICATIONS

European search report issued in European Application No. 19214305.5, dated May 6, 2020, 2 pages.

* cited by examiner

[FIG. 1]
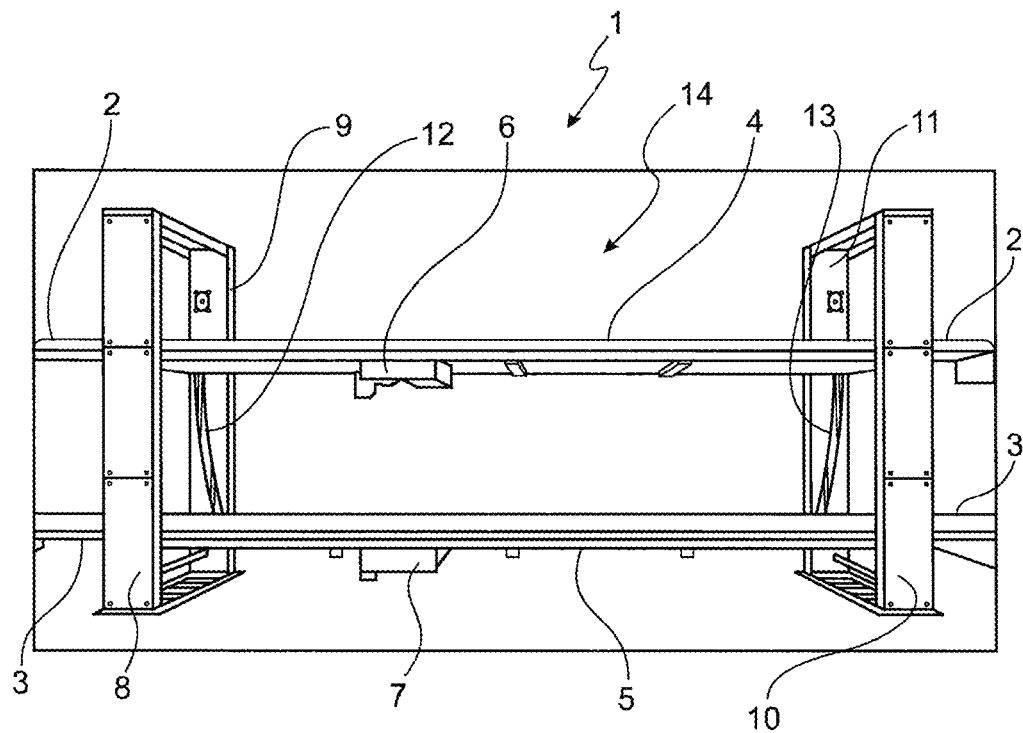
[FIG. 2]
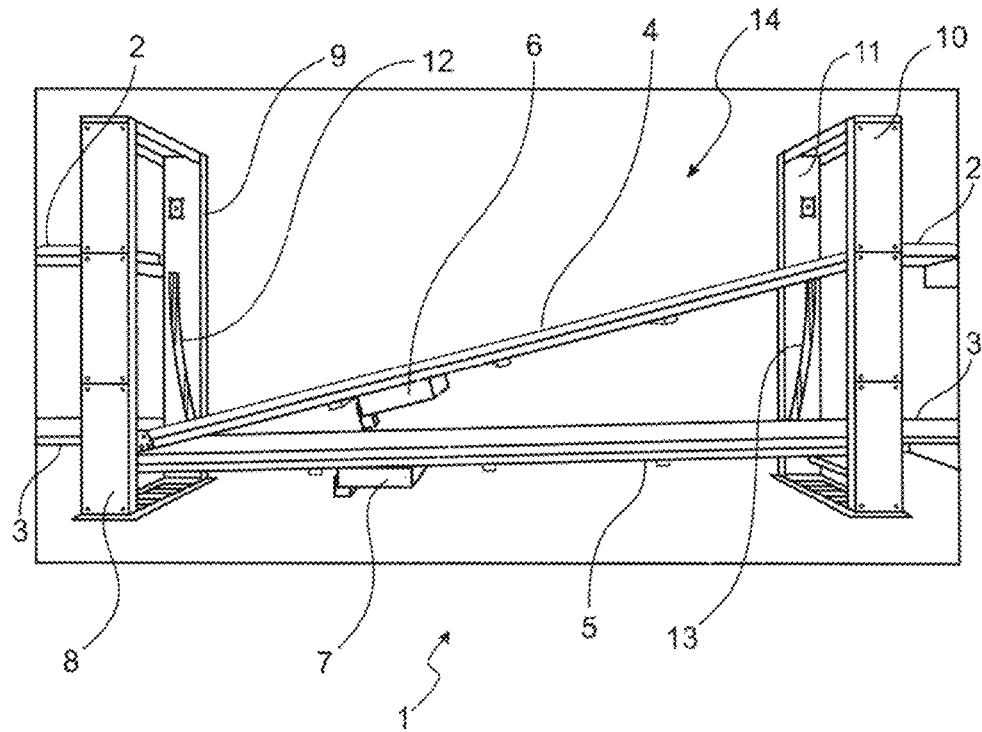

[FIG. 3]
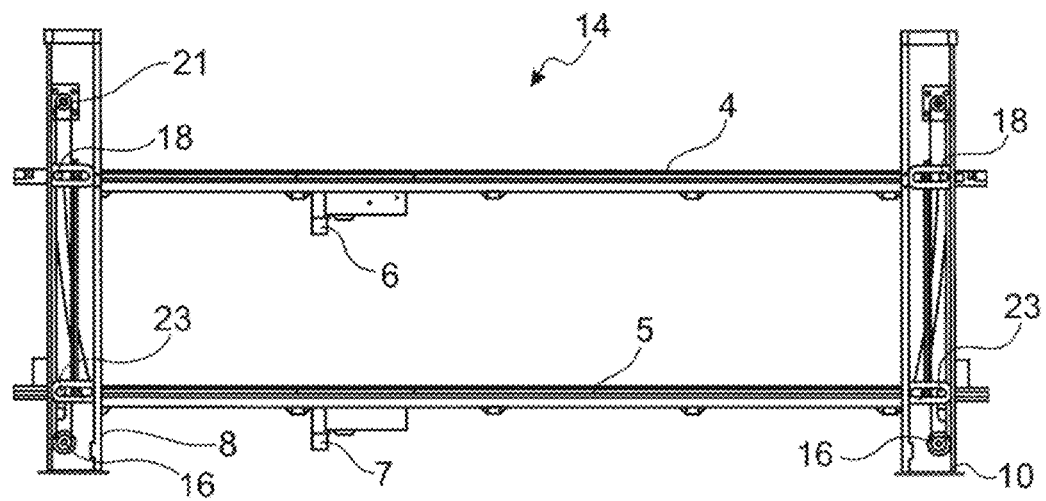
[FIG. 4]
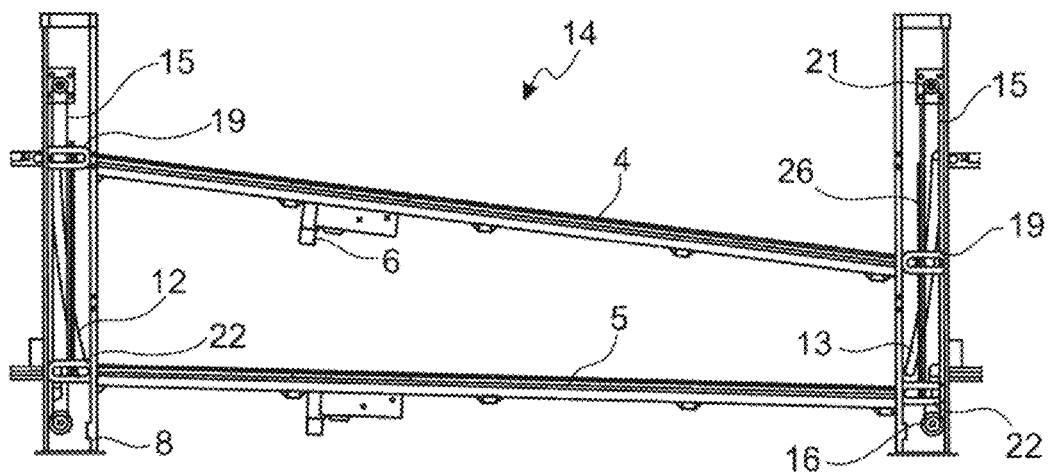
[FIG. 5]
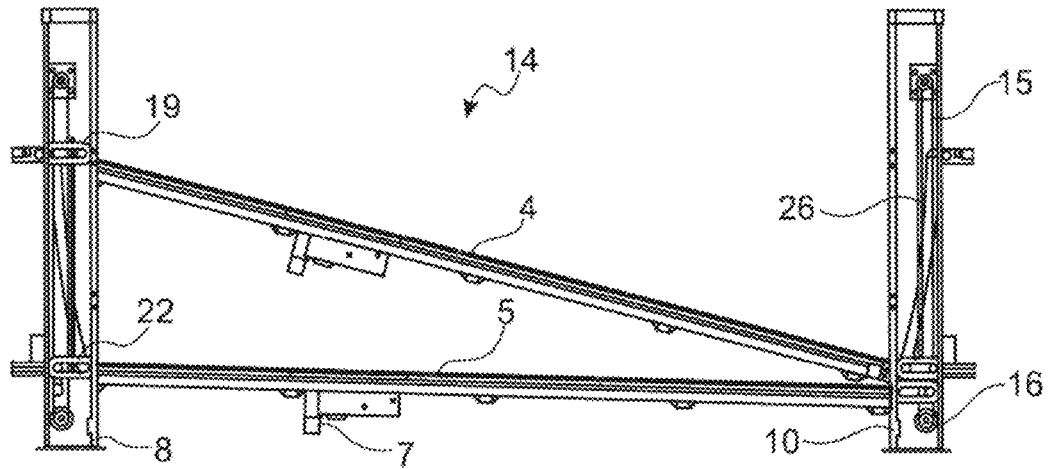

[FIG. 6] 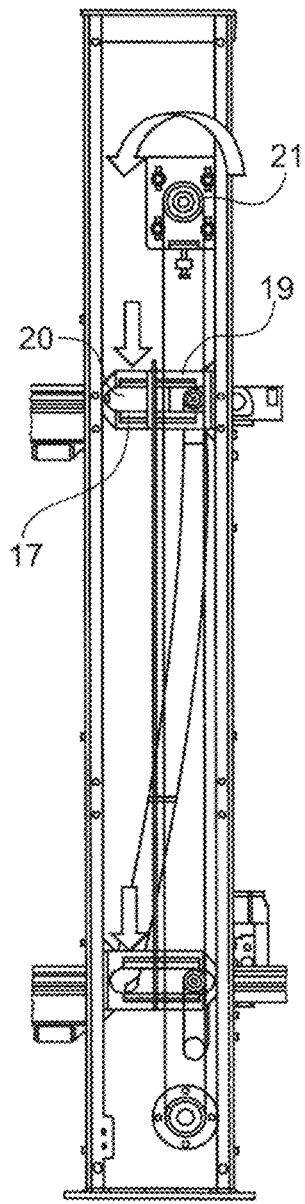
[FIG. 7] 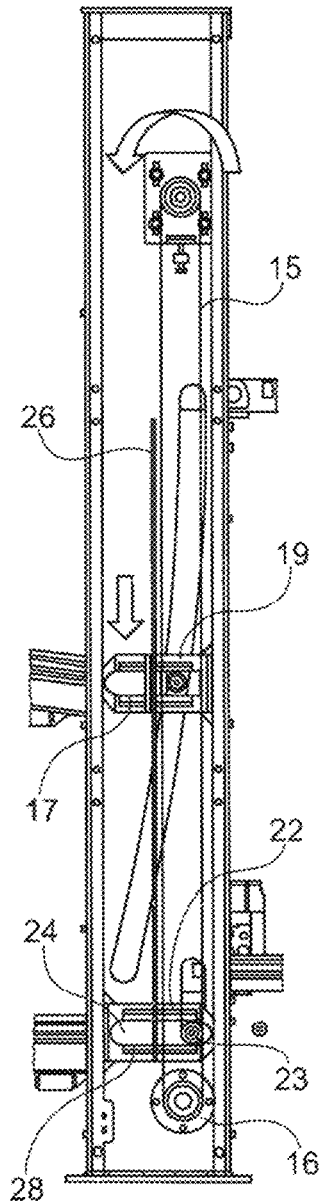
[FIG. 8] 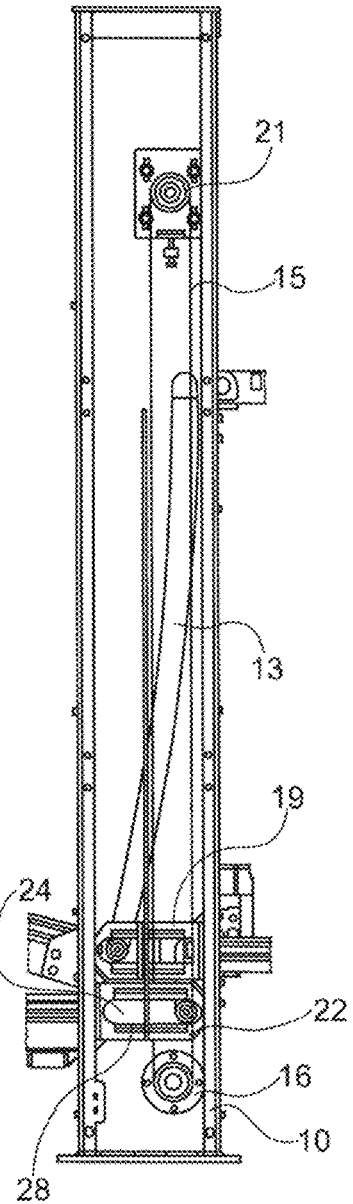

[FIG. 9]
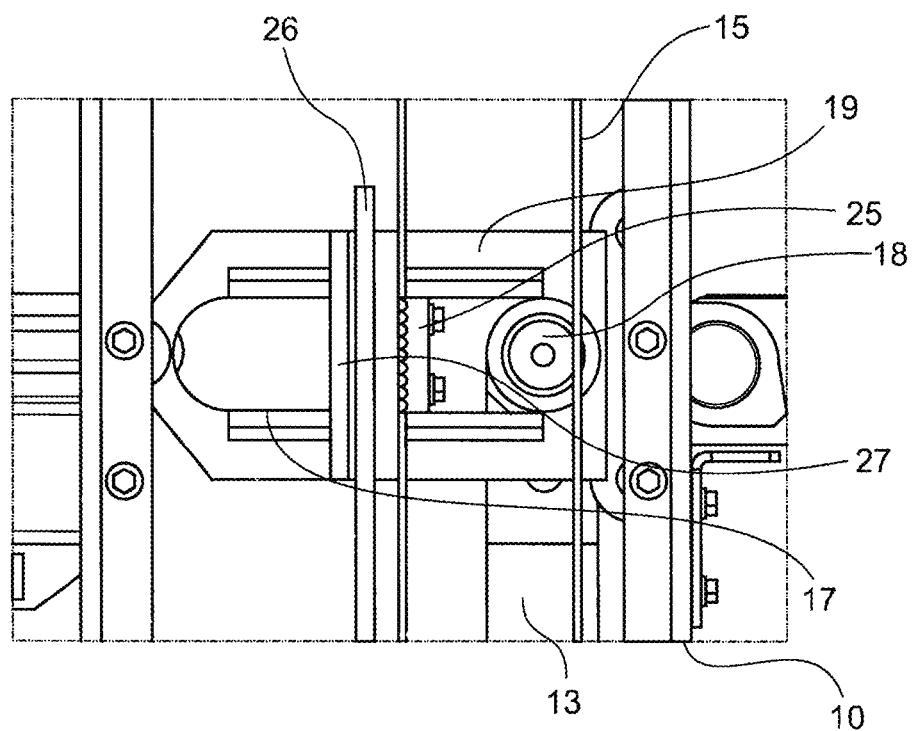
[FIG. 10]
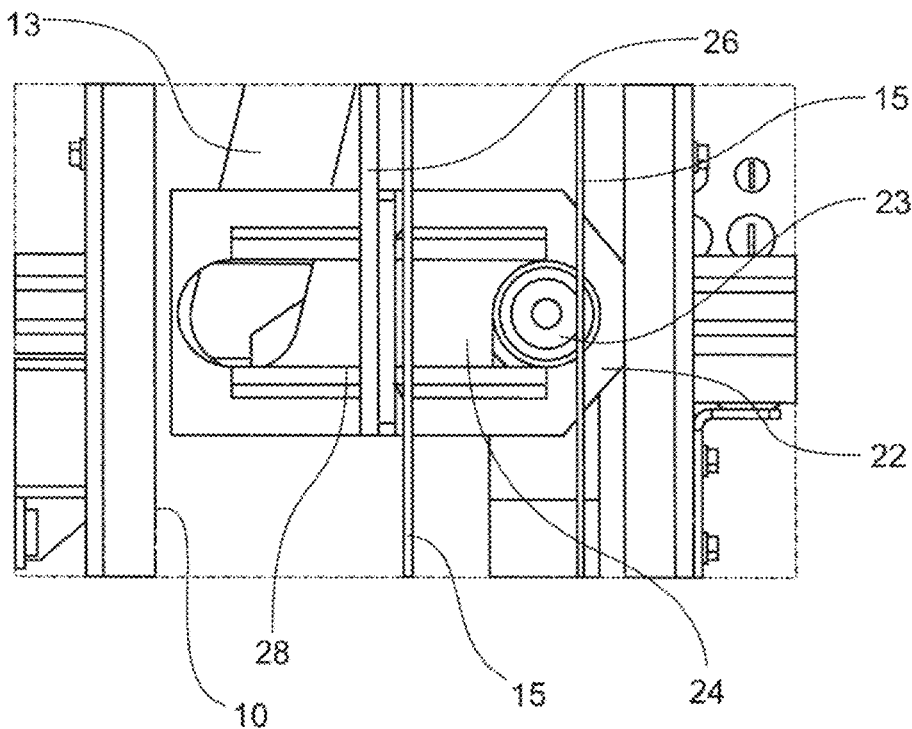

[FIG. 11]
[FIG. 12]
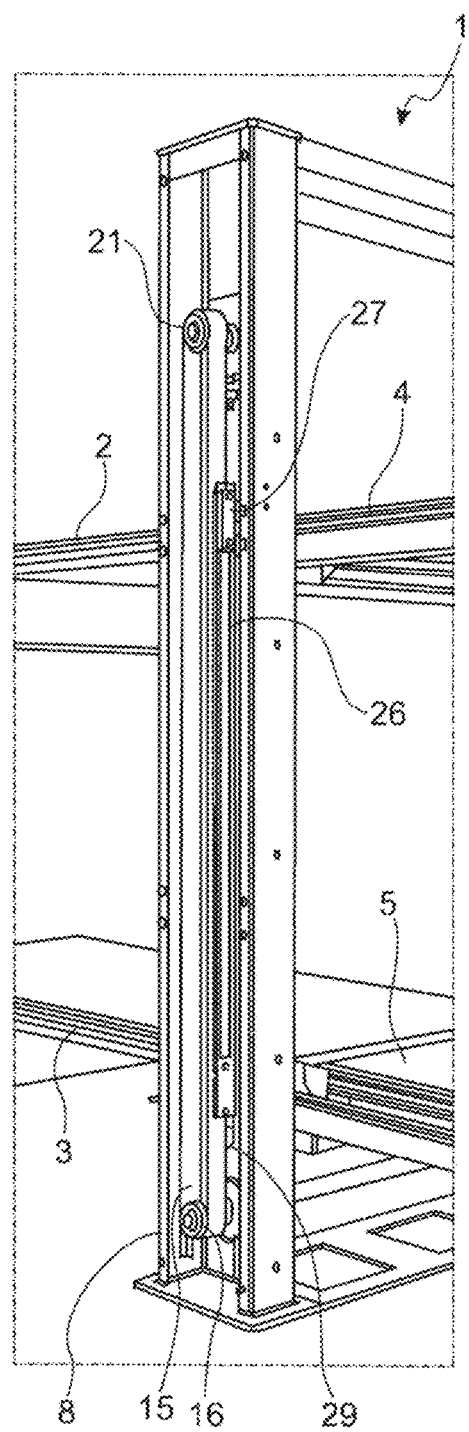
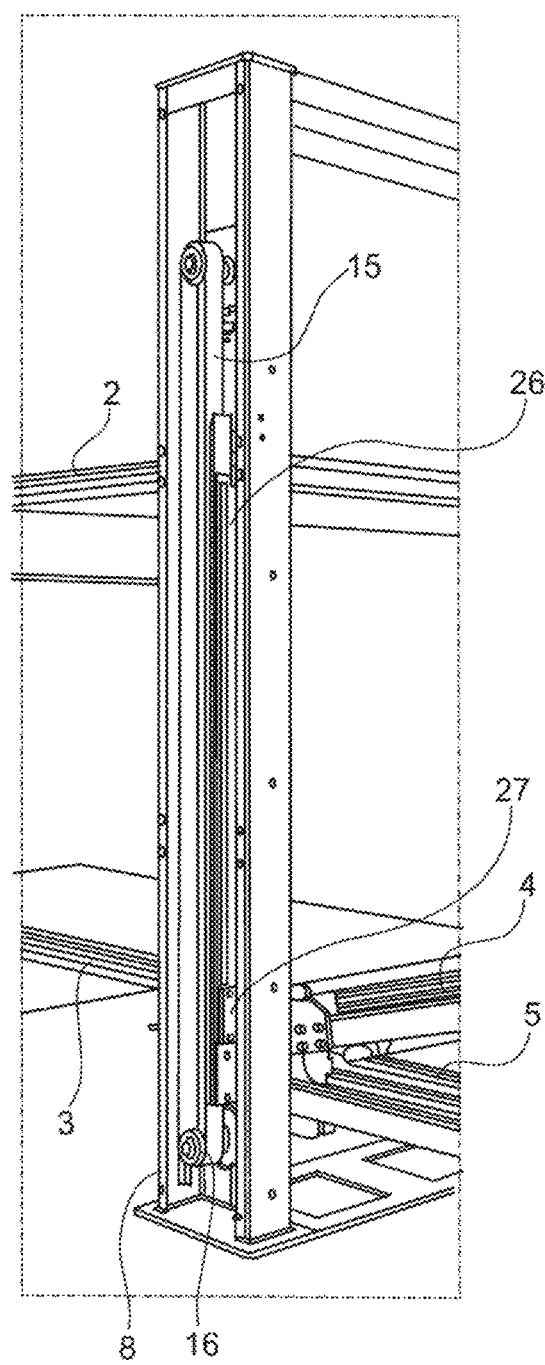

VERTICAL DIVERTER FOR A CONVEYOR SYSTEM

The invention relates to a vertical diverter for a conveyor system having a lower conveyor track and an upper conveyor track, wherein the vertical diverter is provided and designed for vertically connecting the two conveyor tracks, and the vertical diverter has an upper diverter track and a lower diverter track.

A vertical diverter of the aforementioned type is known from EP 1 475 324 B1. In this vertical diverter, two vertically spaced conveying planes are connected to one another by corresponding conveyor tracks, wherein the diverter has a vertical gradient which changes between the two conveyor tracks and which, viewed from the top down along the conveyor track, is initially vertically convex and then vertically concave. Corresponding drive means are provided for this purpose, and the containers to be conveyed, in particular containers for an airport baggage conveyor system, have on their base underside at least one slot-shaped recess running in the direction of movement of the containers.

The invention is based on the object of creating a vertical diverter of the type mentioned at the outset which is of a very simple design and which permits a particularly good connection to the conveyor tracks of the conveying system.

In a vertical diverter for a conveyor system having a lower conveyor track and an upper conveyor track, wherein the vertical diverter is provided and designed for vertically connecting the two tracks, and the vertical diverter has a lower diverter track and an upper diverter track, it is essential to the invention that the lower diverter track be shorter than the upper diverter track, that the lower diverter track be provided and designed to be lowered at least at one end in order to make room for the connection of the end of the upper diverter track to be lowered, and that the upper diverter track be provided and designed to be lowered least at one end, and that the lowered end of the upper diverter track rest where the unlowered end of the lower diverter track previously rested. Such an embodiment achieves in particular a seamless connection of the diverter tracks to the conveyor track, in particular of the lower end of the lowered upper diverter track to the associated lower conveyor track of the conveyor system. In particular, this is achieved by the lower diverter track being shorter than the upper diverter track. In the oblique position of the upper diverter track, a greater length is required to bridge the region of the diverter. This is achieved by the upper diverter track being designed longer than the lower diverter track. The diverter tracks are preferably each designed in one piece so that the transported items, in particular the load units in the diverter, are transported continuously on an interruption-free track. Thanks to the lengths of the diverter tracks according to the invention, the transition to the conveyor tracks of the conveyor system only occurs with minimal gaps between the conveyor tracks and the diverter tracks.

Preferably, the upper diverter track and the lower diverter track are selectively lowerable at either side. In particular, the vertical diverter is designed and provided in such a way that when the upper diverter track is lowered at the left-hand end the lower diverter track at the left-hand end is also lowered accordingly, while the upper diverter track and the lower diverter track remain at the right-hand end in their starting positions. Conversely, this is also done in this way when lowering the upper and lower diverter tracks at the right-hand end, wherein the upper and lower diverter tracks then remain in their position at the left-hand end.

In a particularly preferred embodiment of the invention, the vertical diverter has posts at its end regions in which the mechanism for the movement of the diverter tracks is installed. Furthermore, it is preferred that the vertical diverter has posts at its end regions, each of which is wide enough for an end point of a shorter lower diverter track and also an end point of a longer upper diverter track to lie behind each post, and for these to be covered by the respective post. This also applies to the corresponding end points of the conveyor tracks. These two embodiments can of course be combined with each other. This embodiment of the posts results in an outwardly attractive appearance, wherein the different lengths of the upper diverter track and the lower diverter track and the resulting different connections of the upper conveyor tracks and the lower conveyor tracks are visually unobtrusive. A post designed in this way also allows the mechanism for the corresponding pivoting movement to be installed in the post.

In another preferred embodiment of the invention, the upper diverter track is long enough and has a pivot point arranged in such a way that, in the lowered state, the opposite end lies precisely at the point at which the lower diverter track otherwise ends. For this purpose, the upper diverter track has pivot points at its ends which are defined by the mechanism, depending on which end is lowered. The pivot point is located at the outer edge of the post. After the end of the lowering process, the pivot point of the upper end is still located at the outer edge of the post, and the pivot point of the lowered end is then located at the inner edge of the associated post. The width of a post must therefore be large enough for it to be able to compensate for the difference in length between the upper position and the lower position.

The mechanism for the movement of the diverter tracks is preferably designed in such a way that both the lower diverter track and the upper diverter track are vertically adjustable by means of a motor in a corner region of the diverter. As a result, the mechanism can be operated with an upper and a lower diverter track in a comparatively simple embodiment, namely with only one motor per post. The mechanism for the movement of a diverter track preferably has a slide which moves upwards and downwards and which has a horizontal longitudinal slot in which the end support of the diverter track, which also forms the pivot point, is displaceably guided. Preferably, both the lower diverter track and the upper diverter track are height-adjustable in such slides with a horizontal longitudinal slot. Preferably, the slide of the upper diverter track can be moved by the motor via a toothed belt.

In another preferred embodiment of the invention, the slide of the lower diverter track is fixedly connected to a guide rail which is movably connected to the slide of the upper diverter track, wherein the guide rail is dimensioned such that the movement of the lower diverter track is coupled to the movement of the upper diverter track. The guide rail is designed in such a way that it rests on the upper slide and moves downwards as a whole when the upper slide is lowered so that the slide of the lower diverter track is likewise lowered until it reaches a stop. The slide of the upper diverter track can then slide in or on the guide rail, since it is not fixedly connected thereto. In the upward movement of the upper slide that is driven by the motor, the upper slide first moves upwards in the guide rail until it reaches the upper stop on the guide rail and then also takes the guide rail with it upwards and also takes the lower slide fastened thereto with it upwards.

A further aspect of the invention relates to a conveyor system having a lower conveyor track and an upper conveyor track, and having a vertical diverter for connecting the two conveyor tracks in accordance with the above description.

The conveyor system is preferably designed such that in the region of the vertical diverter the lower conveyor track projects further than the upper conveyor track. In particular, the lower conveyor track projects precisely far enough for it to be attached to the shorter lower diverter track. As a result, there is a gap-free connection with the upper conveyor track and the lower conveyor track both in the region of the upper diverter track and in the region of the lower diverter track. The transitions between the conveyor tracks and the diverter tracks are located in the region of the posts which are arranged in the end regions of the diverter.

A further aspect of the invention relates to a method for operating a vertical diverter for a conveyor system having a lower conveyor track and an upper conveyor track, wherein the vertical diverter is provided and designed for connecting the two conveyor tracks and has a lower diverter track and an upper diverter track, and the lower diverter track is shorter than the upper diverter track. In terms of procedure, when the upper diverter track is lowered at one end, the lower diverter track is simultaneously lowered at this end until the lower diverter track reaches its target position, and the upper diverter track is then lowered further until it rests by its lowered end where the unlowered end of the lower diverter track previously rested. With this method, the vertical diverter according to the invention can be operated particularly well.

Preferably, the upper diverter track is raised again from the lowered state in that the lowered end is correspondingly pivoted upward and, after a certain partial movement, the lowered lower diverter track is then also raised so that the upper diverter track and the lower diverter track simultaneously reach their starting positions. With this method, an adjustment of the two diverter tracks can be achieved in a particularly simple manner.

The invention will be explained in more detail below with reference to an exemplary embodiment illustrated in the drawing. Specifically, the schematic diagrams show in:

FIG. 1: a side view of a diverter according to the invention in which the upper diverter track and the lower diverter track are in horizontal alignment;

FIG. 2: a side view of a vertical diverter according to FIG. 1, wherein the upper diverter track is lowered to connect a lower conveyor track to an upper conveyor track;

FIG. 3: a side view of an upper conveyor track comparable to FIG. 1 looking inside the posts of the diverter;

FIG. 4: a side view of the diverter according to FIG. 3 according to the invention when the upper conveyor track is in a partially lowered position;

FIG. 5: a side view of the diverter according to FIG. 3 according to the invention when the upper conveyor track is in a lowered position;

FIG. 6: an enlarged representation of a post with the mechanism accommodated therein according to FIG. 3;

FIG. 7: an enlarged representation of the post according to FIG. 4;

FIG. 8: an enlarged representation of the post according to FIG. 5;

FIG. 9: a detailed representation of a slide of the upper diverter track;

FIG. 10: a detailed representation of a slide of the lower diverter track;

FIG. 11: a perspective view of a part of the conveyor system with an open post with horizontally oriented diverter tracks; and FIG. 12: a perspective view of a part of the conveyor system with an open post with a lowered lower diverter track.

FIGS. 1 and 2 each show a conveyor system 1 having an upper conveyor track 2 and a lower conveyor track 3. The conveyor tracks 2 and 3 are interrupted, and the gap is closed off by a diverter 14 having an upper diverter track 4 and a lower diverter track 5. In the transition region between the upper conveyor track 2 and the upper diverter track 4 and between the lower conveyor track 3 and the lower diverter track 5, posts 8, 9 are arranged at each end, in this case in the left-hand region of the diverter 14, and posts 10, 11 in this case in the right-hand region of the diverter 14. The diverter 14 overall comprises the upper diverter track 4, the lower diverter track 5 and the posts 8, 9, 10, 11. The posts 8 and 9 and 10 and 11 are in each case connected to each other at the top and at the bottom for mechanical stabilization so that a portal is formed in each case, through which run the conveyor tracks 2, 3 with the following diverter tracks 4, 5. The posts 8, 9, 10, 11 are designed to be wide enough for the end regions of the diverter tracks 4 and 5 to lie behind the posts 8, 9, 10, 11 viewed from the side when the diverter tracks 4 and 5 are aligned horizontally as well as when the upper diverter track 4 according to FIG. 2 is in a lowered state at one end. The posts have recesses 12, 13 which are curved on the inside and in which corresponding supports and pivot points of the upper diverter track 4 run and are guided along these recesses 12, 13. It can also be seen in this case that the upper diverter track 4 terminates close to the outside in the post 9 when horizontally oriented, but in the lowered state according to FIG. 2, it terminates near the inner edge region of the posts 8 and 9. In either case, however, the upper conveyor track 4 lies snugly against the upper conveyor track 2 or then against the lower conveyor track 3. This is achieved by the upper diverter track 4 being longer than the lower diverter track 5 and, in order to adapt thereto, the upper conveyor track 2 does not protrude as far into the posts 8, 9, 10, 11 as does the lower conveyor track 3. The upper conveyor track 2 terminates in the outer region of the posts 8, 9, 10, 11, while the lower conveyor track 3 projects into the central region or even almost into the inside region of the posts 8, 9, 10, 11. The diverter tracks are driven by their own motors. The upper diverter track 4 has a drive motor 6, and the lower diverter track 5 has a drive motor 7 which drives the conveyor device of the diverter track, that is to say for example a conveyor belt or driven rollers. The motors 6 and 7 are each arranged below their corresponding diverter tracks 4 and 5.

Assuming a transportation direction from left to right, three different conveyor configurations are possible. Firstly, the configuration illustrated in FIG. 1 is possible in which the load units are conveyed on the two conveyor tracks 2 and 3 running in parallel and accordingly also run through the diverter 14.

FIG. 2 shows the second case, namely that the upper diverter track 4 is lowered at the infeed end, and the load units are then transported from the left-hand lower conveyor track 3 via the lowered upper diverter track 4 to the upper conveyor track 2 that follows on the right. In the third case, which is not shown here, the upper diverter track 4 is lowered at the delivery end, that is to say on the right-hand side when the conveying direction is from left to right, and remains at the top at the left-hand side. The load units are then conveyed from the upper conveyor track 2 at the left-hand side, via the upper diverter track 4 that is lowered on the right, to the lower conveyor track 3 which follows the diverter 14 on the right.

In FIGS. 3 to 6, side views of the diverter 14 are shown, wherein in each case the front covering of the posts 8 and 10 has been removed so that the mechanism for the movement of the diverter tracks is made visible.

FIG. 3 shows a position comparable to FIG. 1, and FIG. 5 shows a position comparable to the position in FIG. 2, but with an opposing lowered end, as has also been described as a third case in connection with FIGS. 1 and 2. FIG. 4 shows an intermediate state of the movement between FIGS. 3 and 5.

The right-hand post in each case is shown in FIGS. 6, 7 and 8 in an enlarged view. FIGS. 3 and 6, FIGS. 4 and 7 and FIGS. 5 and 8 correspond with regard to the position of the upper diverter track 4.

In the four posts 8, 9, 10, 11, a drive belt 15 is provided which is vertically oriented and driven by a motor 16. The motor 16 is preferably arranged at the lower end of the respective posts 8, 10. In the upper end region of the posts, the belt 15, which is preferably a toothed belt, runs over a deflection roller 21. The belt 15 is fixedly connected to a slide 19, wherein the slide 19 has a horizontal slot 20 in which a guide roller 18 of the upper diverter track 4 is accommodated. The slide 19 is supported with rollers on both sides of the post 8, 10 and is moved up and down by means of the belt 15, the motor 16 and the deflection roller 21. On its underside, the horizontal slot 20 forms a running surface 17 on which the guide roller 18 can roll, so that during the movement of the slide 19 from top to bottom and in the posts 10, the guide roller 18 can roll from the outside to the inside, in this case from right to left, on the running surface 17 of the horizontal slot 20. When the upper diverter track 4 is lowered, this automatically causes a change in length which is implemented by the rollers seated in the horizontal slot 20. Correspondingly, in the post 10 on the side facing the diverter track 4, the arcuate recess 13 is provided, by means of which the guide roller 18 is connected to the upper diverter track 4. In the same way, a second slide 22 is provided which is arranged below the first slide 19 in the posts 8, 10 and in which a guide roller 23 is displaceable in a horizontal slot 24, wherein said guide roller 23 is connected to the lower diverter track 5. The second slide 22 is also guided laterally on rollers in the posts 8, 10, and is movable up and down in the post. The second guiding slide 22 does not have its own motor drive. The second slide 22 is connected to a guide rail 25 which is connected to the slide 19 of the upper diverter track 4 and is thus moved along therewith.

In FIG. 9, an enlarged representation of a section of the post 10 with the slide 19 is shown. The slide 19 rides up and down on the sides of the post 10 with rollers therein. The guide roller 18 can travel along the running surface 17 of the slide 19 and, with the downward movement of the slide 19, moves leftwards to the inside of the post 10 since the horizontal extension of the upper diverter track 4 is shortened due to the increasingly oblique position of the upper diverter track 4. The slide 19 is moved up and down by means of the belt 15, wherein the belt 15 is fixedly connected to the slide 19 by means of a clamping plate 25. Suspended on the slide 19 is a guide rail 26 which slides along there on a guide block 27, wherein the guide block 27 is fixedly connected to the slide 19. The guide rail 26 serves to move the lower slide 22 which moves the lower diverter track 5.

In FIG. 10, the post 10 is shown in the region of the lower slide 22. The guide rail 26 is fixedly connected to the lower slide 22. In the lower slide 22, a horizontal slot 24 is provided, in which the guide roller 23 can roll on a running surface 28.

FIGS. 11 and 12 show in each case a perspective view of the conveyor system 1 in the region of the left-hand post 8 of the diverter 14 shown in FIGS. 1 and 2. The upper conveyor track 2 and the lower conveyor track 3 can be seen in each case in the region on the left in FIGS. 11 and 12, while the upper diverter track 4 and the lower diverter track 5 are shown in the region on the right. Also shown here in the post 8 is the belt 15 with the motor 16 and the deflection roller 21 with which the upper slide 19 is moved which moves the upper diverter track 4 up and down. In FIG. 11, the upper diverter track 4 is in the upper position. In these figures, the guide rail 26 in particular is readily discernible which is displaceably fastened to the slide 19 by the guide block 27. When according to FIG. 11 the upper slide 19 and thus the upper diverter track 4 is lowered with the aid of the motor 16 and the belt 15, the guide rail 26 displaceably fastened thereto also moves downward. Thus, the lower slide 22, which is fixedly connected to the guide rail 26, then also moves downward until the guide roller 23 and the lower diverter track 5 connected thereto arrive at a stop 29. The upper slide 22 then moves further downward, wherein the guide block 27 travels downwardly along the vertical recess of the guide rail 26 until the upper slide 19 reaches its lowest position, namely precisely the posts where the lower diverter track 5 was previously. There is now a direct connection there to the lower conveyor track 3.

During the upward movement, the motor 7 moves in the opposite direction, and the belt 15 which is designed in particular as a toothed belt, also moves the upper slide 19 upward. During this upward movement, the guide roller 18 is moved back to the outside of the post within this horizontal slot 20 of the slide 19. Shortly before reaching the end point, the slide 19 and thus also the guide block 27 reach the end of the guide rail 26. Together with the guide block 27, the upper slide 19 then lifts the guide rail 26 and thus also the lower slide 22 rigidly connected to the guide rail 26. The upper slide 19 and the lower slide 22 then simultaneously reach their horizontal end position.

All features mentioned in the above description and in the claims can be combined in any selection with the features of the independent claim. The disclosure of the invention is thus not limited to the combinations of features described or claimed, but rather all combinations of features which are useful within the scope of the invention are to be considered disclosed.

The invention claimed is:

1. A conveyor system (1) that comprises a lower conveyor track (3) and an upper conveyor track (2), wherein the conveyor system further comprises a vertical diverter (14) for vertically connecting the upper conveyor track and the lower conveyor track (2,3) and wherein the vertical diverter (14) has a lower diverter track (5) and an upper diverter track (4), wherein
the lower diverter track (5) is shorter than the upper diverter track (4),
the lower diverter track (5) is provided and designed to be lowered at least at one end in order to make room for the connection of the end of the upper diverter track (4) that is to be lowered,
the upper diverter track (4) is provided and designed to be lowered at least at one end, and the lowered end of the upper diverter track (4) rests where the unlowered end of the lower diverter track (5) previously rested, and the lower diverter track (5) and the upper diverter track (4) are selectively lowerable at either end.

2. The conveyor system according to claim 1, wherein the vertical diverter (14) has posts (8, 9, 10, 11) at its end regions in which the mechanism for the movement of the diverter tracks (4, 5) is installed.

3. The conveyor system according to claim 1, wherein the vertical diverter (14) has posts (8, 9, 10, 11) at its end regions, each of which is wide enough for an end point of a shorter lower diverter track (5) and also an end point of a longer upper diverter track (4) to lie behind each post (8, 9, 10, 11), these end points being covered by the respective post (8, 9, 10, 11).

4. The conveyor system according to claim 1, wherein the upper diverter track (4) is long enough and has a pivot point arranged in such a way that, in the lowered state, the opposite end lies precisely at the point where the lower diverter track (5) otherwise ends.

5. The conveyor system according to claim 1, wherein the mechanism for the movement of the diverter tracks (4, 5) has a motor (16) in a corner region of the diverter (14) by means of which both the lower diverter track (5) and the upper diverter track (4) can be driven.

6. The conveyor system according to claim 1, wherein the mechanism for moving the diverter tracks (4, 5) moves a slide (19, 22) up and down which has a horizontal longitudinal slot (20, 24) in which the end support of the diverter track (4, 5) is displaceably guided.

7. The conveyor system according to claim 6, wherein the slide (19) of the upper diverter track (4) can be moved up and down by the motor (16) by means of a belt (15).

8. The conveyor system according to claim 6, wherein the slide (22) of the lower diverter track (5) is fixedly connected to a guide rail (26) which is movably connected to the slide (19) of the upper diverter track (4), and wherein the guide rail (26) is dimensioned such that the movement of the lower diverter track (5) is coupled to the movement of the upper diverter track (4).

9. The conveyor system according to claim 1, wherein in the region of the vertical diverter (14) the lower diverter track (3) projects further than the upper diverter track (2).

10. A method for operating a vertical diverter (14) for a conveyor system (1), with a lower conveyor track (3) and an upper conveyor track (2), wherein the vertical diverter (14) connects the upper conveyor track and the lower conveyor track (2, 3) and has a lower diverter track (5) and an upper diverter track (4), and wherein the lower diverter track (5) is shorter than the upper diverter track (4), and wherein when the upper diverter track (4) is lowered at one end, the lower diverter track (5) is simultaneously lowered at that end until the lower diverter track (5) reaches its target position, and the upper diverter track (4) is then lowered further until it rests with its lowered end where the unlowered end of the lower diverter track (5) previously rested, and wherein the lower diverter track (5) and the upper diverter track (4) are selectively lowerable at either end.

11. Method according to claim 10, wherein the upper diverter track (4) is raised again from the lowered state in that the lowered end is correspondingly pivoted upwardly and, after a certain partial movement, the lowered lower diverter track (5) is then also raised so that the upper diverter track (4) and the lower diverter track (5) simultaneously reach their starting positions.

\* \* \* \* \*